United States Patent
Rehana et al.

(10) Patent No.: US 10,198,289 B2
(45) Date of Patent: Feb. 5, 2019

(54) RELATING USER ACTION FLOWS BY STORING RELATIONSHIPS BETWEEN THREADS AND OBJECTS

(71) Applicant: HEWLETT PACKARD ENTERPRISE DEVELOPMENT LP, Houston, TX (US)

(72) Inventors: Moran Rehana, Yehud (IL); Michael Seldin, Yehud (IL); Michael Abramov, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 97 days.

(21) Appl. No.: 15/128,197

(22) PCT Filed: Apr. 29, 2014

(86) PCT No.: PCT/US2014/035938
§ 371 (c)(1),
(2) Date: Sep. 22, 2016

(87) PCT Pub. No.: WO2015/167474
PCT Pub. Date: Nov. 5, 2015

(65) Prior Publication Data
US 2017/0097848 A1    Apr. 6, 2017

(51) Int. Cl.
*G06F 9/48* (2006.01)
*G06F 9/44* (2018.01)
*G06F 11/07* (2006.01)
*G06F 11/34* (2006.01)
*G06F 9/451* (2018.01)

(52) U.S. Cl.
CPC ............ *G06F 9/4881* (2013.01); *G06F 9/451* (2018.02); *G06F 11/0718* (2013.01); *G06F 11/0751* (2013.01); *G06F 11/34* (2013.01)

(58) Field of Classification Search
None
See application file for complete search history.

(56) References Cited

U.S. PATENT DOCUMENTS 6,314,451 B1 * 11/2001 Landsman ............. G06Q 30/02
709/202
6,714,962 B1 * 3/2004 Helland ............... G06F 21/6218
707/999.01

(Continued)

OTHER PUBLICATIONS

Attariyan, Mona et al. "Automating Configuration Troubleshooting with Dynamic Information Flow Analysis." In OSDI, pp. 237-250. 2010.

(Continued)

*Primary Examiner* — Abu Ghaffari (57) ABSTRACT

A system for connecting user action flows is disclosed. The system determines when a first object is created on a first thread in response to a first user action. Additionally, the system stores a first relationship between the first thread and the first object based on the determination of when the first object is created. Moreover, the system determines when the first object is running on a second thread that differs from the first thread, and stores a second relationship between the second thread and the first object based on the determination of when the first object is running.

19 Claims, 7 Drawing Sheets

(56) References Cited

U.S. PATENT DOCUMENTS

| | | | |
|---|---|---|---|
| 6,823,524 B1* | 11/2004 | Hewett | G06F 9/542 |
| | | | 718/103 |
| 7,778,717 B2* | 8/2010 | Bachman | G05B 19/41865 |
| | | | 700/83 |
| 7,818,743 B2* | 10/2010 | Branda | G06F 9/52 |
| | | | 718/100 |
| 7,835,814 B2 | 11/2010 | Mock et al. | |
| 7,882,492 B2* | 2/2011 | Viswanadha | G06F 11/3664 |
| | | | 717/124 |
| 8,117,234 B2* | 2/2012 | Parrott | G06F 17/30286 |
| | | | 707/802 |
| 8,312,435 B2 | 11/2012 | Wygodny et al. | |
| 8,423,561 B2* | 4/2013 | Osborne | G06F 17/30283 |
| | | | 707/756 |
| 8,423,635 B2 | 4/2013 | Catlin et al. | |
| 9,535,776 B2* | 1/2017 | Klose | G06Q 10/06 |
| 9,552,221 B1* | 1/2017 | Pora | G06F 9/46 |
| 2001/0056457 A1* | 12/2001 | Kikuchi | G06F 9/4843 |
| | | | 718/104 |
| 2002/0144233 A1 | 10/2002 | Chong et al. | |
| 2004/0059733 A1* | 3/2004 | Li | G06F 9/52 |
| 2005/0149930 A1 | 7/2005 | Doggett | |
| 2006/0010337 A1 | 1/2006 | Suzuki | |
| 2006/0271916 A1* | 11/2006 | Abe | G06F 11/0715 |
| | | | 717/128 |
| 2008/0134156 A1 | 6/2008 | Osminer et al. | |
| 2009/0199196 A1* | 8/2009 | Peracha | G06F 11/3409 |
| | | | 718/104 |
| 2009/0320021 A1 | 12/2009 | Pan et al. | |
| 2010/0257538 A1* | 10/2010 | Zhao | G06F 9/4881 |
| | | | 718/106 |
| 2011/0238437 A1* | 9/2011 | Zhou | G06F 19/3487 |
| | | | 705/2 |
| 2012/0066378 A1* | 3/2012 | Lui | G06F 11/3612 |
| | | | 709/224 |
| 2012/0158794 A1* | 6/2012 | DeBacker | G06F 9/449 |
| | | | 707/803 |
| 2014/0026002 A1* | 1/2014 | Haines | G06F 11/0766 |
| | | | 714/57 |
| 2014/0109064 A1 | 4/2014 | Gritter et al. | |

OTHER PUBLICATIONS

International Search Report and Written Opinion dated Dec. 30, 2014, PCT Patent Application No. PCT/US2014/035938 dated Apr. 29, 2014, Korean Intellectual Property Office, 9 pages.

Zhang, Lide et al. "Panappticon: event-based tracing to measure mobile application and platform performance." In Hardware/Software Codesign and System Synthesis (CODES+ ISSS), 2013 International Conference on, pp. 1-10. IEEE, 2013.

* cited by examiner

| USER ACTION | THREAD | OBJECT | CREATE/RUN | TIMESTAMP |
|---|---|---|---|---|
| 1 | Ui | A1 | 1 | X |
| 1 | T1 | A1 | 2 | X+2 |
| 1 | T1 | Z4 | 1 | X+5 |
| 1 | T2 | Z4 | 2 | X+6 |
| 1 | T2 | A3 | 1 | X+3 |
| 1 | Ui | A3 | 2 | X+12 |
| 4 | Ui | R4 | 1 | X+15 |
| 4 | T4 | R4 | 2 | X+17 |

RELATING USER ACTION FLOWS BY STORING RELATIONSHIPS BETWEEN THREADS AND OBJECTS

CROSS-REFERENCE TO RELATED APPLICATION

This application is a U.S. National Stage Application of and claims priority to International Patent Application No. PCT/US2014/035938, filed on Apr. 29, 2014, and entitled "RELATING USER ACTION FLOWS BY STORING RELATIONSHIPS BETWEEN THREADS AND OBJECTS", the entire contents of which are hereby incorporated in its entirety.

BACKGROUND

A typical computing device may allow a user to interact with an application through a user interface displayed on a display device. For instance, when a user performs a user action, such as clicking a button displayed on the user interface of the computing device, the application may cause the processor of the computing device to execute a number of processes related to the user action. These processes may be executed in parallel by the computing device using multiple threads within the application.

BRIEF DESCRIPTION OF THE DRAWINGS

The following detailed description references the drawings, wherein.

DETAILED DESCRIPTION

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

As discussed above, applications generally run on at least one thread (e.g., an execution stream) which is initialized during the launch of the application. For example, when an application is launched, a computing device may create a main thread of execution for the application. A main thread may be in charge of the application's user interface. In some instances, when a user interacts with the user interface (e.g., by clicking a button), the main thread may be executing in the background to complete tasks associated with the user action. For example, the application may create and run an object (e.g., an entity that consists of data and functions) on the main thread, which in turn may create a number of separate background threads to divide the work associated with the user action into separate pieces. These pieces may then be run in parallel on various background threads so that the application can run more quickly and efficiently. This way, the main thread may continue to be responsive while any objects created in response to the user action are being processed. While the use of multiple threads may result in a faster and more efficient application, the use of multiple threads may also make it more difficult to discover complex application bugs or to otherwise trace the chain of events that lead to a particular problem in the application.

Traditional methods of troubleshooting application errors may require extensive developer involvement, and may not result in the identification of the cause of the error. For example, traditional methods may include generating an application crash log that includes a complete stack trace for every executing thread that was running when the application terminated. An application developer may have to review a significant amount of information in the log to determine where the error was thrown and, even if the crash log included the appropriate data, it may be difficult to determine which user action caused the error. As another example, custom tracing code may be added into the application to help determine where the error was thrown. However, even if the custom code was included, it may be difficult to understand because it would be hard to know the user action flow that caused the error. Accordingly, some traditional methods of troubleshooting application errors do not allow the application developer to obtain the information it needs quickly and efficiently.

Examples disclosed herein provide user action flow to enable an application owner to identify an error in the application that was coming from a specific thread and/or to quickly trace the chain of events that lead to the error. To this end, example implementations disclosed herein may provide user action flow by connecting a user action, an object created in response to the user action, a thread on which the object was created (the "creating thread"), and a thread that ran the object (the "running thread"). For example, some implementations may determine when an object has been created on a thread in response to a user action. Additionally, some implementations may store a relationship between the object and the creating thread. For example, some implementations may map the object and the creating thread in a way that indicates that the object was created on the creating thread in response to the user action. Furthermore, some implementations may determine when the object is run on a running thread and store a relationship between the object and the running thread. For example, some implementations may map the object and the running thread in a way that indicates that the object ran on the running thread in response to the user action.

Figure 1:
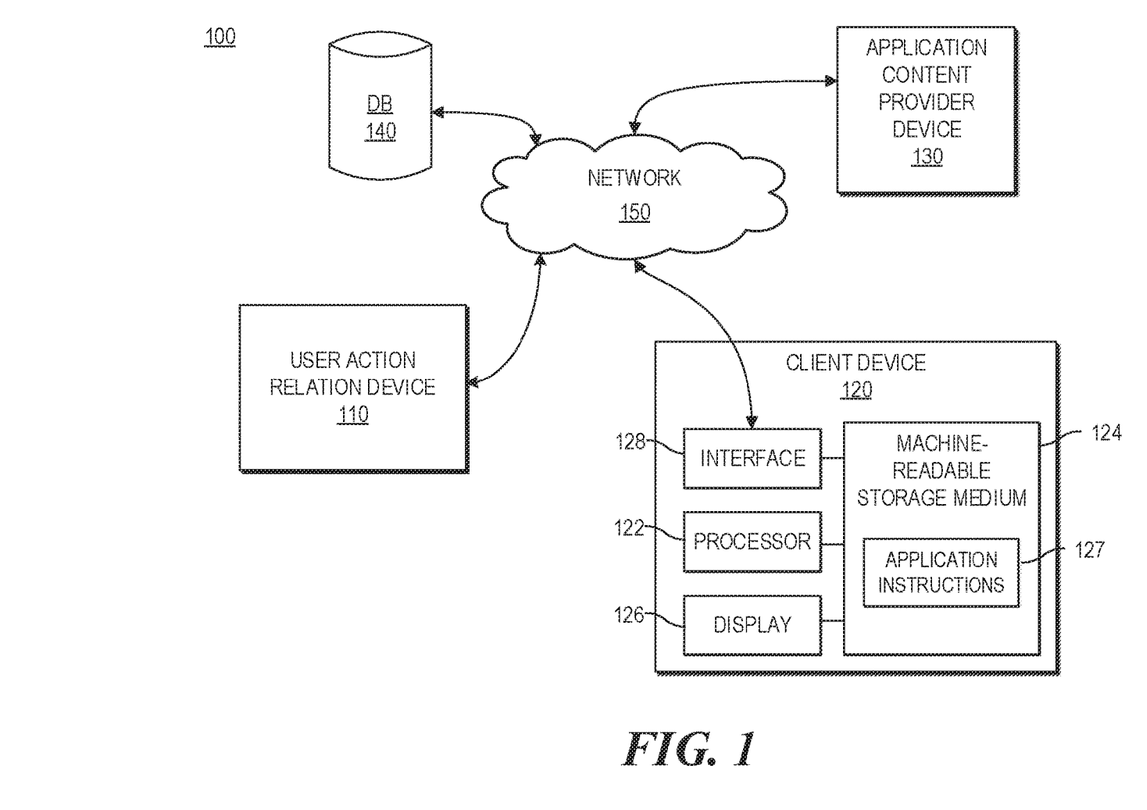
FIG. 1 is a block diagram of an example system for relating user action flows consistent with disclosed implementations.

Referring now to the drawings. FIG. 1 is a block diagram of an example system 100 for providing user action flow consistent with disclosed implementations. System 100 may be implemented in a number of different configurations without departing from the scope of the disclosed examples. In the example shown in FIG. 1, system 100 may include a user action relation device 110, a client device 120, an application content provider device 130, a database 140, and a network 150 for connecting user action relation device 110 with client device 120, application content provider device 130, and/or database 140.

User action relation device 110 may be a computing system that performs various functions consistent with disclosed examples, such as, for example, storing relationships between a user action, an object created in response to a user action, a creating thread, and a running thread. For example, relation device 110 may be a desktop computer, a laptop computer, a tablet computing device, a mobile phone, a server, and/or any other suitable type of computing device. In some examples, relation device 110 may process information received from client device 120, application content provider device 130, and/or database 140. For example, relation device 110 may determine when an object is created on a first thread in response to a user action, determine when the object is run on a second thread, and store relationships between the user action, the object, the first thread, and/or the second thread. Examples of relation device 110 and certain functions that may be performed by device 110 are described in greater detail below with respect to, for example, FIGS. 2-8.

Client device 120 may be a computing system operated by a user. For example, client device 120 may be a desktop computer, a laptop computer, a tablet computing device, a mobile phone, a server, and/or any other type of computing device. In some examples, client device 120 may be a computing device to perform operations consistent with certain disclosed implementations. For example, client device 120 may be adapted to detect a user action and to update a user interface in response to the user action. Client device 120 may include a processor to execute instructions stored in a machine-readable storage medium. In the example shown in FIG. 1, client device 120 may include a processor 122, a machine-readable storage medium 124, a display device 126, and an interface 128. Processor 122 of client device 120 may be at least one processing unit (CPU), microprocessor, and/or another hardware device to execute instructions to perform operations. For example, processor 122 may fetch, decode, and execute instructions stored in machine-readable storage medium 124 (such as application instructions 127) to display a user interface, to detect a user action, to update the user interface in response to the user action, and/or to collect and/or transmit data associated with the user action. Machine-readable storage medium 124 may be any electronic, magnetic, optical, or other non-transitory storage device that stores instructions executed by processor 122. Display device 126 may be any type of display device that presents information, such as a user interface, to a user operating client device 120. Interface device 128 may be any combination of hardware and/or programming that facilitates the exchange of data between the internal components of client device 120 and external components, such as user action relation device 110. In some examples, interface device 128 may include a network interface device that allows client device 120 to receive and send data to and from various components, such as user action relation device 110 via network 150.

Application content provider device 130 may be a computing system operated by the content provider of an application. For example, content provider device 130 may be a desktop computer, a laptop computer, a tablet computing device, a mobile phone, a server, or any other type of computing device. In some examples, content provider device 130 may be a computing device capable of receiving a request from client device 120 to update a user interface based on a user action. Additionally, content provider device 130 may transmit user interface update instructions based on the user action to client device 120. The user interface update instructions may be used by client device 120 to provide a user interface response to the user via a display, such as display device 126. For example, client device 120 may store the user interface update instructions in machine-readable storage medium 124, and/or processor 122 of client device 120 may execute the user interface update instructions to update the user interface with new text, graphics, and/or a combination of text and graphics. This information may be stored in a storage device, such as a machine-readable storage medium and/or a database, such as database 140.

Database 140 may be any type of storage system configuration that facilitates the storage of data. For example, database 140 may facilitate the locating, accessing, and retrieving of data (e.g., SaaS, SQL, Access, etc. databases). Database 140 can be populated by a number of methods. For example, relation device 110 may populate database 140 with database entries generated by relation device 110, and store the database entries in database 140. As another example, relation device 110 may populate database 140 by receiving a set of database entries from another component, a wireless network operator, or a user of client device 120 and/or application content provider device 130, and storing the database entries in database 140. The database entries may contain a plurality of fields, which may include information related to user action flow such as, for example, the date/time of the user action, the name of the user action, an object created in response to the user action, the date/time the object was created, the creating thread, the running thread, the user, the client device type, the device operating system type, relationships between the user action, the object, the creating thread, the running thread, and/or any other type of information related to user action flow. While in the example shown in FIG. 1 database 140 is a single component external to components 110, 120, and 130, database 140 may comprise separate databases and/or may be part of devices 110, 120, 130, and/or another device. In some implementations, database 140 may be managed by components of devices 110, 120, and/or 130 that are capable of accessing, creating, controlling and/or otherwise managing data remotely through network 150.

Network 150 may be any type of network that facilitates communication between remote components, such as relation device 110 and client device 120. For example, network 150 may be a local area network (LAN), a wide area network (WAN), a virtual private network, a dedicated intranet, the Internet, and/or a wireless network.

The arrangement illustrated in FIG. 1 is simply an example, and system 100 may be implemented in a number of different configurations. For example, while FIG. 1, shows one relation device 110, client device 120, content provider device 130, database 140, and network 150, system 100 may include any number of components 110, 120, 130, 140, and 150, as well as other components not depicted in FIG. 1. For example, system 100 may omit any of components 110, 120, 130, 140, and 150, and/or the functionality of at least one of components 110, 120, 130, 140, and 150 may be incorporated into another component (e.g., components 110, 120, 130, 140, 150, and/or a component not shown in FIG. 1).

Figure 2:
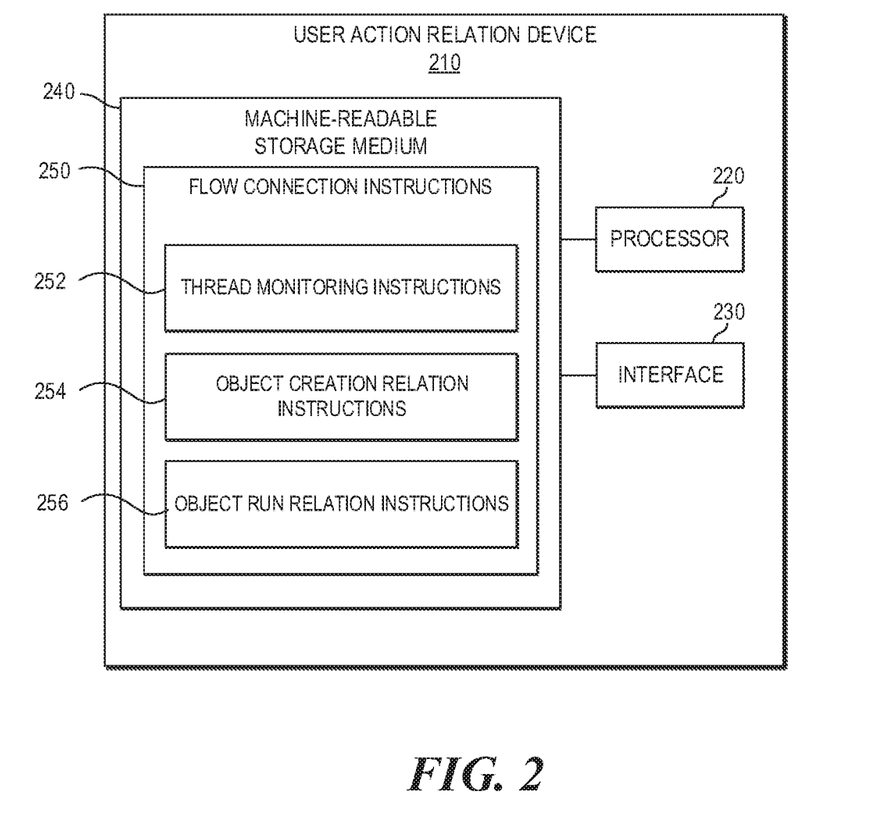
FIG. 2 is a block diagram of an example user action relation device consistent with disclosed implementations.

FIG. 2 is a block diagram of an example user action relation device 210 consistent with disclosed implementations. In certain aspects, user action relation device 210 may correspond to user action relation device 110 of FIG. 1. Relation device 210 may be implemented in various ways. For example, relation device 210 may be a special purpose computer, a server, a mainframe computer, a computing device executing instructions that receive and process information and provide responses, a mobile phone, and/or any other type of computing device. In the example shown in FIG. 2, relation device 210 may include a processor 220, an interface 230, and a machine-readable storage medium 240.

Processor 220 may be at least one processing unit (CPU), microprocessor and/or another hardware device to execute instructions to perform operations. For example, processor 220 may fetch, decode, and execute flow connection instructions 250 (e.g., instructions 252, 254 and/or 256) stored in machine-readable storage medium 240 to perform operations related to disclosed examples.

Interface device 230 may be any device that facilitates the transfer of information between device 210 and external components, such as client device 120. In some examples, interface device 230 may include a network interface device that allows device 210 to receive and send data to and from network 150. For example, interface device 230 may retrieve and process data related to user actions from client device 120 via network 150.

Machine-readable storage medium 240 may be any electronic, magnetic, optical, or other physical storage device that stores executable instructions. Thus, machine-readable storage medium 240 may be, for example, Random Access Memory (RAM), Electrically-Erasable Programmable Read-Only Memory (EEPROM), a storage drive, an optical disc, and the like. In some implementations, machine-readable storage medium 240 may be a non-transitory computer-readable storage medium, where the term "non-transitory" does not encompass transitory propagating signals. Machine-readable storage medium 240 may be encoded with instructions that, when executed by processor 220, perform operations consistent with disclosed implementations. For example, machine-readable storage medium 240 may include instructions that perform operations that may relate user action flows, such as by connecting a user action with an object that is created in response to the user action, the creating thread of the object, and the running thread of the object. In the example shown in FIG. 2, machine-readable storage medium 240 may include thread monitoring instructions 252, object creation relation instructions 254, and object run relation instructions 256.

Thread monitoring instructions 252 may function to monitor a thread. For example, when thread monitoring instructions 252 are executed by processor 220, thread monitoring instructions 252 may cause processor 220 of relation device 210, processor 122 of client device 120, and/or another processor to monitor a thread for a user action and/or determine when an object is created on the thread in response to the user action. Examples of monitoring a thread are described in further detail below with respect to, for example, FIGS. 4-7.

Object creation relation instructions 254 may function to relate an object to its creating thread. For example, when object creation relation instructions 254 are executed by processor 220, object creation relation instructions 254 may cause the processor 220 of relation device 210, the processor 122 of client device 120, and/or another processor to store a relationship between an object, the thread that created the object, the user action that initiated the creation of the object, and/or other data related to the user action in machine-readable storage medium 240 and/or in another storage device, such as database 140. Examples of relating an object with its creating thread are described in further detail below with respect to, for example, FIGS. 4-7.

Object run relation instructions 256 may function to relate an object to its running thread. For example, when object run relation instructions 256 are executed by processor 220, object run relation instructions 256 may cause the processor 220 of relation device 210, processor 122 of client device 120, and/or another processor to store a relationship between an object, the thread that run the object, the user action that initiated the run of the object, and/or other data related to the user action in machine-readable storage medium 240 and/or in another storage device, such as database 140. Examples of relating an object with its running thread are described in further detail below with respect to, for example, FIGS. 4-7.

Figure 3:
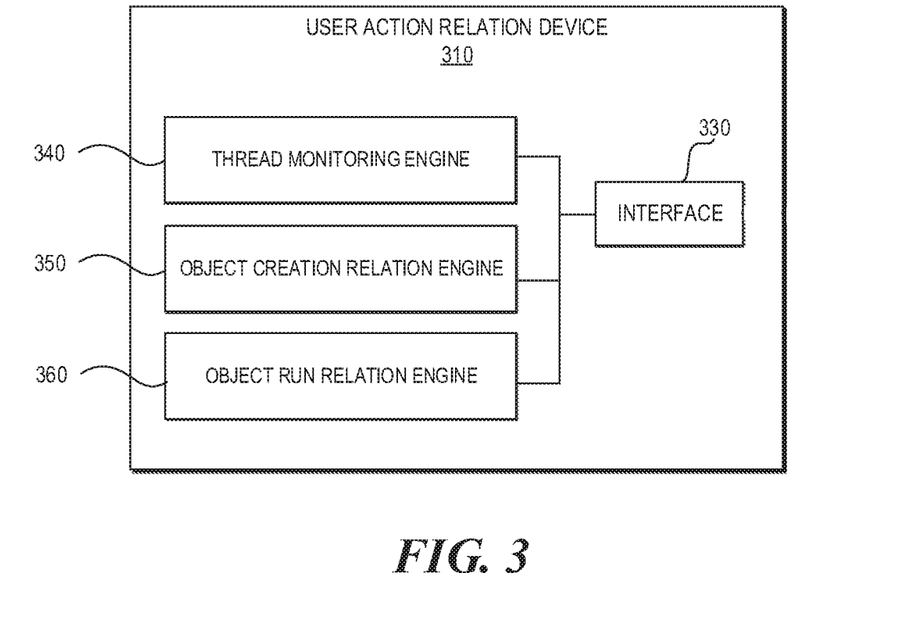
FIG. 3 is a block diagram of another example user action relation device consistent with disclosed implementations.

FIG. 3 is a block diagram of an example user action relation device 310 consistent with disclosed implementations. In certain aspects, user action relation device 310 may correspond to user action relation device 110 of FIG. 1 and/or user action relation device 210 of FIG. 2. Device 310 may be implemented in various ways. For example, device 310, may be a special purpose computer, a server, a mainframe computer, a computing device executing instructions that receive and process information and provide responses, and/or any other type of computing device. In the example shown in FIG. 3, device 310 may include an interface device 330, a thread monitoring engine 340, an object relation engine 350, and an object run relation engine 360.

Interface device 330 may be any device that facilitates the transfer of information between user action relation device 310 and external components, such as client device 120. In some examples, interface device 330 may include a network interface device that allows user action relation device 310 to receive and send data to and from network 150. For example, interface device 330 may retrieve and process data related to user actions from client device 120 via network 150.

Engines 340, 350, and 360 may be electronic circuitry for implementing functionality consistent with disclosed examples. For example, engines 340, 350, and 360 may represent combinations of hardware devices and programming to implement the functionality consistent with disclosed implementations. In some examples, the functionality of engines 340, 350, and 360 may correspond to operations performed by user action relation device 210 of FIG. 2, such as operations performed when flow connection instructions 250 are executed by processor 220 (described above with respect to FIG. 2). In FIG. 3, thread monitoring engine 340 may represent a combination of hardware and programming that performs operations similar to those performed when processor 220 executes thread monitoring instructions 252. Similarly, object creation relation engine 350 may represent a combination of hardware and programming that performs operations similar to those performed when processor 220 executes object creation relation instructions 254, and object run relation engine 360 may represent a combination of hardware and programming that performs operations similar to those performed when processor 220 executes object run relation instructions 256.

Figure 4:
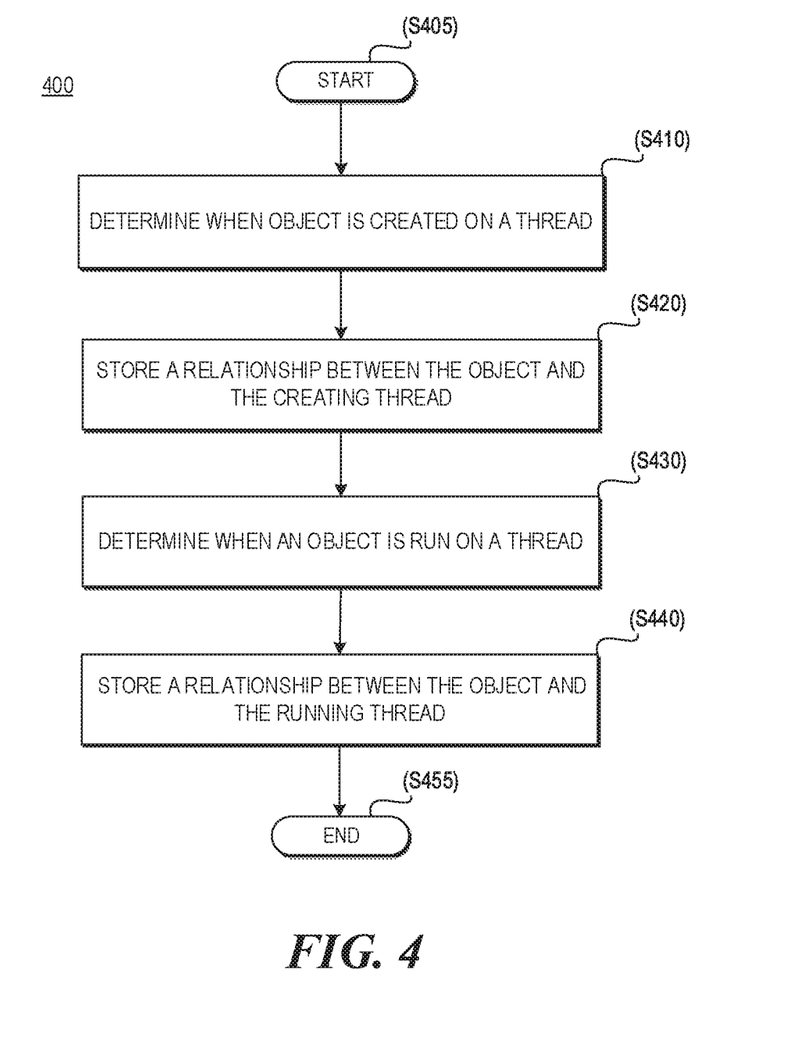
FIG. 4 is a flow chart of an example process for relating user action flows consistent with disclosed implementations.

FIG. 4 is a flow chart of an example process 400 for relating user action flows consistent with disclosed implementations. Although execution of process 400 is described below with reference to system 100 of FIG. 1 and/or specific components of system 100, other suitable systems and devices for execution of at least one step of process 400 may be used. For example, processes described below as being performed by relation device 110 may be performed by client device 120, user action relation device 210, user action relation device 310, and/or any other suitable device. Process 400 may be implemented in the form of executable instructions stored on a machine-readable storage medium and/or in the form of electronic circuitry.

Process 400 may start (step S405) when an application has been launched by a user. For example, when a user launches an application via client device 120, application instructions 127, when executed by processor 122, may initialize a thread (e.g., a main thread). A user interface may be run on this thread, and displayed on a display device. For example, client device 120 may output a user interface for an application on an available display, such as display device 126. The user interface may include content, such as text, graphics, or a combination of text and graphics, which represents information and/or actions that are available to a user. For example, the user interface may include hyperlinks, radio buttons, checkboxes, text entry boxes, buttons, and other types of controls that a user may interact with. Users may interact with the interface by inputting a user action related to the control to client device 120. For example, a user may execute a mouse click, move a mouse, execute a touch gesture on a touch-enabled display, execute a voice command, and/or any provide another type input.

Once the main thread has been initialized, process 400 may include determining when an object is created on a thread (step S410) in response to a user action. In some implementations, system 100 may determine when an object is created on a thread by monitoring a main thread to determine when a user action occurs and the type of user action that occurred. For example, system 100 may monitor the main thread to determine whether a user has marked or unmarked a checkbox, activated a button, updated a position of a slider on a slider bar, requested search results, navigated to a different part of the user interface, requested a drop down menu, requested new text and/or graphics, and/or otherwise interacted with an element of the user interface. In some implementations, system 100 may monitor a main thread (or any thread) by creating and adding a thread event monitor that detects and reacts to events that occur on a particular thread. For example, the thread event monitor can monitor a thread for a creation of an object, the run of an object, the termination of an object, and the like.

System 100 may also determine when an object is created on a thread by instrumenting a constructor of an object. For example, application instructions 127 of client device 120 may include constructors (e.g., blocks of code that are executed to create an object) that may determine the actions taken when an object is created (e.g., the functions performed by the object). In some implementations, user action relation device 110 may automatically determine the creation of those objects by instrumenting the constructors of the objects to transmit flow data and/or mapped flow data to a storage device. For example, user action relation device 110 may instrument the constructors of the object to send flow data related to the object to a storage device, such as database 140, in response to the object being created and/or the object being run. The flow data may include information related to the user action, information related to any object created in response to the user action, the creating thread of the object, and the running thread of the object. In some implementations, the flow data may indicate that the currently executing thread is the creating thread and that the thread on which the object will be run is the running thread.

Process 400 may include storing a relationship between the object and the creating thread (step S420). For example, in some implementations, process 400 may include determining an object identifier for the object and a thread identifier for the creating thread. For example, each instance of an object and each thread may have an identifier that uniquely identifies the object. This representation of the identity of an object may be referred to as an object identifier. Similarly, the representation of the identity of the thread may be referred to as a thread identifier. In some implementations, an object may retain the same object identifier for the entire life the object, and a thread may retain the same thread identifier for the entire life of the thread. In some implementations the object identifier and/or the thread identifier may be global identifiers that identify the thread and/or object in a distributed computing system, local identifiers that identify the thread and/or object in a particular storage system, and/or another type of identifier. The object identifier and/or the thread identifier may be an alphanumeric character string and/or any other type of value. System 100 may determine the values of the object identifier and/or the thread identifier by accessing at least one hash code associated with the object identifier and the thread identifier.

In some implementations, storing a relationship between the object and the creating thread may include creating and/or storing a mapping that associates the object identifier with the creating thread identifier. For example, system 100 may store the creating thread identifier and the object identifier in a data structure in a manner that connects the creating thread identifier with the object identifier and/or the user action. In some implementations, the data structure may be any type of structure used to store and organize data. For example, a data structure may be an array, a record, a database entry, a lookup table, a hash table, a map, a tree, a linked list, and/or any other type of data structure. In some implementations, the data structure may be stored in a storage device, such as a machine-readable storage medium in user action relation device 110, machine-readable storage medium 124 of client device 120, and/or database 140. In some implementations, the storage device may be external to system 100 or to various components of system 100.

In some implementations, the mapping may be created in response to a user action, and may be updated in response to an object related to the user action being created and/or run. For example, when a new object is created on a thread (e.g., the main thread), the data structure may be updated to reflect the creation of the new object. As another example, when the new object is run on a thread (e.g., the main thread or another thread), the data structure may be updated to reflect the run of the new object. In some implementations, the data structure may be updated to reflect the object identifier of the new object and the thread identifier of the creating thread in manner that indicates that the object was created on the creating thread in response to the user action as well as the interrelationships between the object and other objects created in response to the user action. In some implementation, the data structure may include an entry that connects the user action identifier with an object created based on the user action, a thread that created the object, and another thread that ran the object. For example, the data structure may include an entry with the user action identifier, the object identifier, a thread identifier, an indication of whether the thread identifier was a creating thread or a running thread (e.g., "1" for a creating thread, "2" for a running thread), a time stamp, and/or any other information that could be used to connect the user action with any object related to the user action, the thread that created the object, and the thread that ran the object, as well as the interrelationships between each object and/or between each thread. An example of a data structure consistent with disclosed implementations is discussed in more detail below with respect to, for example, FIG. 5.

The management of a data structure may be implemented in various ways. In some examples, system 100 may create the mapping and/or may update the data structure each time an object is created and/or run. In some examples, system 100 may create the mapping and/or may update the date structure in a bulk operation by creating a temporary data structure to store the relationships between the user action, an object, a creating thread, and a running thread. The temporary data structure may be the same as, similar to, or different from the data structure.

Process 400 may also include determining when the object is run on a thread (step S430). For example, system 100 may monitor the creating thread and/or another thread (e.g., using an event monitor, instrumenting a constructor of the object, and/or the like) to determine when the object is run on a particular thread. If the object is run on the thread, process 400 may include storing a relationship between the object and the running thread (step S440). For example, system 100 may determine the object identifier and the running thread identifier by using at least one of the methods discussed above with respect to step S420 and/or using a different type of method. Like with step S420, in some implementations, storing a relationship between the object and the running thread may include creating and/or storing a mapping that associates the object identifier with the running thread identifier. For example, the running thread identifier and the object identifier may be stored in a data structure in a manner that connects the running thread identifier with the object identifier and/or the user action. The data structure may be identical to, similar to, or different from the data structure associated with storing the relationship between the object and the creating thread (e.g., step S420).

After the determination has been made of when an object has been created on a creating thread in response to a user action, the relationship between the creating thread and the object has been stored, the determination has been made of when the object is run on a running thread, and the second relationship between the running thread and the object has been stored, process 400 may end (step S455).

Figure 5:
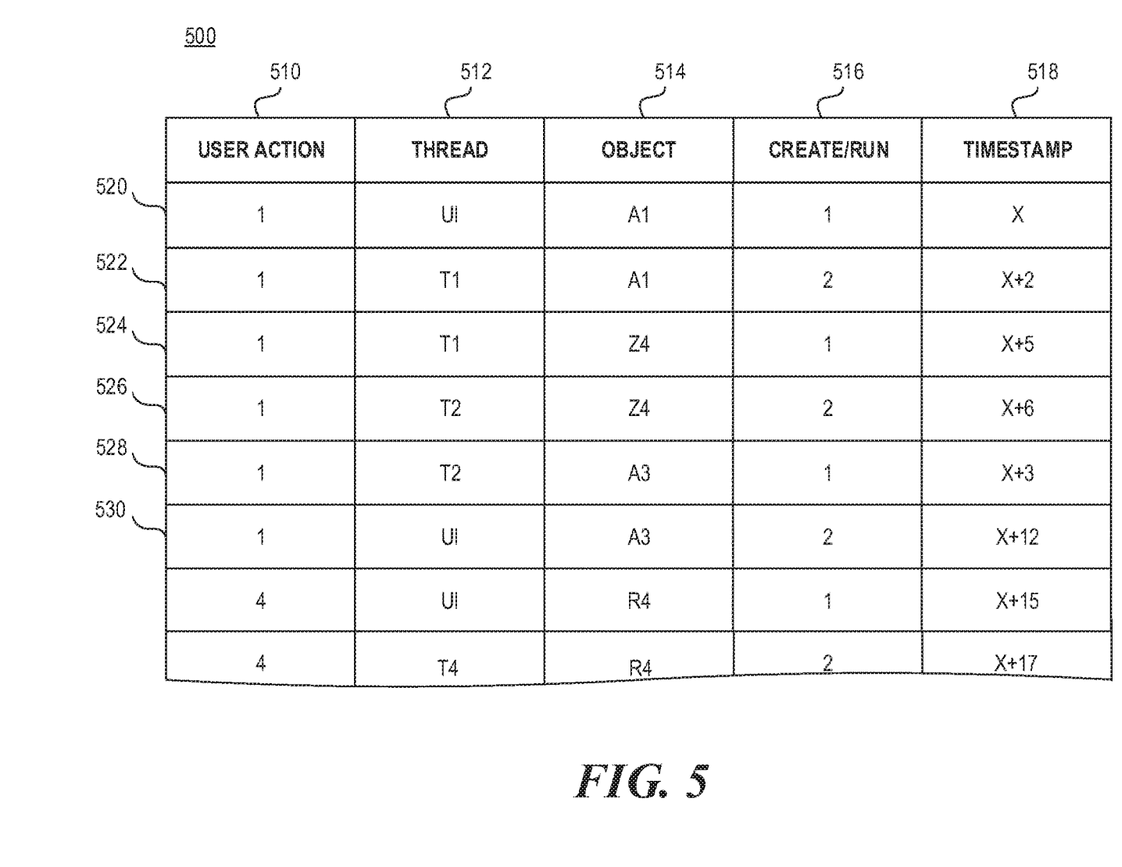
FIG. 5 is an example of a data structure for storing relationships consistent with disclosed implementations.

FIG. 5 is an example of a data structure 500 for storing relationships consistent with disclosed implementations. Although the example data structure 500 is described below as being managed by, updated by, and/or otherwise utilized by system 100 of FIG. 1 and/or specific components of system 100, other suitable systems and devices for managing, updating, and/or otherwise utilizing data structure 500 may be used. For example, processes described below as being performed by relation device 110 may be performed by client device 120, user action relation device 210, user action relation device 310, and/or any other suitable device. Processes performed with respect to data structure 500 may be implemented in the form of executable instructions stored on a machine-readable storage medium and/or in the form of electronic circuitry In the example shown in FIG. 5, data structure 500 may include a number of entries associated with one or more user actions. In some implementations, data structure 500 may include a number of rows and columns that indicate relationships between a user action, an object related to the user action, the creating thread of the object, the running thread of the object, and/or other objects associated with the user action and their corresponding creating and/or running threads. For example, a row of data structure 500 may represent the creation or run of an object, while the columns may include data relating to the creation or run. As shown in FIG. 5, an example data structure 500 may include a column for the user action identifier 510, a column for the thread identifier 512, a column for the object identifier 514, a column for an indication of whether the data is related to the creation or the run of the object 516 (e.g., a "1" for create and a "2" for run), and a timestamp 518 associated with the creation and/or run. While the example data structure 500 shown in FIG. 5 includes a number of rows and columns reflecting particular types of flow data in a single table, a data structure consistent with disclosed examples may be any type of data structure (e.g., multiple tables, a linked list, etc.) and may include different types and/or amounts of flow data than that depicted in FIG. 5 (e.g., flow data related to a particular device that performed the user action, a particular OS the device used, a different scheme to differentiate between an entry related to a creation and a run, etc.).

In some implementations, system 100 may use flow data, such as the flow contained in data structure 500, to determine a user action flow. For example, system 100 may use flow data to trace the flow of each user action in a user session. As another example, system 100 may use the data to trace the flow of a particular user action from the time the user action is performed until the last task related to the user action is run and/or complete. In some implementations, system 100 may determine a user action flow by performing a query based on at least one input. For example, system 100 may perform a query based on the user action identifier to determine any object connected to the user action, the creating thread of the object, the running thread of the object, and/or the time of creation and/or run of the object. As another example, system 100 may perform a query based on a particular object to determine the object's creating thread, the object's running thread, the user action related to the particular object, other objects related to the user action and/or the object and their respective creating and/or running threads.

Referring to the example in FIG. 5, if system 100 performed a query to obtain information related to user action "1" stored in example data structure 500, the query may return flow data included in rows 520, 522, 524, 526, 528, and 530 (collectively, the "first user action rows"). System 100 may use the flow data to provide information relating to user action flows. For example, system 100 may use the flow data to determine that three objects (A1 at time X, Z4 at time X+5, and A3 at time X+3) were created in response to the user action. As another example, system 100 may use the flow data to determine object A1 was created on the UI thread and ran on thread T1; object A3 was created on the T1 thread and ran on the UI thread; and object Z4 was created and run on the T1 thread. As another example, system 100 may use the flow data to determine that: the initial object created in response to user action 1 was object A1 (created at time X on the UI thread and run on thread T1); that object A1 spawned object A3 (created at time X+3 on thread T1 and run on the UI thread); and that object A1 also spawned object Z4 (created at time X+5 on thread T1). As another example, system 100 may also use the flow data to determine that the last object related to the user action to update the user interface was object Z4. System 100 may present the information relating to user action flows to a display device, such as a display device associated with application content provider device 130.

Figure 6:
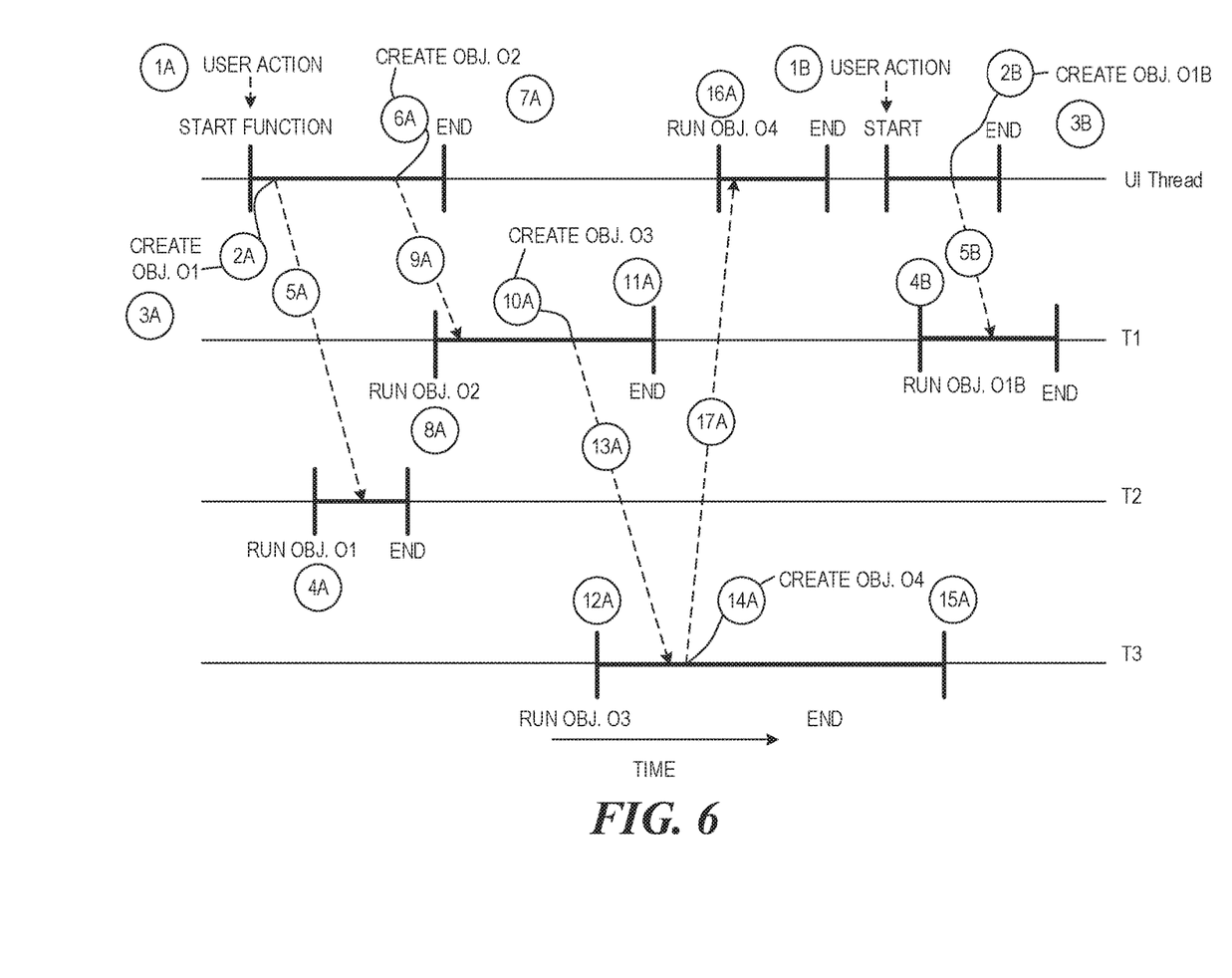
FIG. 6 is a diagram illustrating an example of relating of user action flows consistent with disclosed implementations.

FIG. 6 is a diagram illustrating an example of relating of user action flows consistent with disclosed implementations. The example of FIG. 6 illustrates various user actions, and the resultant concurrent processing of the user actions by separate threads executing on a device. Although the example of FIG. 6 is described below with reference to system 100 of FIG. 1 and/or specific components of system 100, other suitable systems and devices for execution of at least one step of the example shown in FIG. 6 may be used. For example, processes described below as being performed by relation device 110 may be performed by client device 120, user action relation device 210, user action relation device 310, and/or any other suitable device. The processed involved with the example shown in FIG. 6 may be implemented in the form of executable instructions stored on a machine-readable storage medium and/or in the form of electronic circuitry.

In the example shown in FIG. 6, a user may invoke the creation of an object by performing a first user action (1A). For example, a main thread (e.g., a UI thread) of an application on a device, such as client device 120, may manage the presentation of user interface screens that may allow a user to perform a user action related to one or more control types (e.g., a button, a check box, etc.). The detection of this first user action in turn may initiate a handler (e.g., an object) to perform various functions. For example, the handler may initiate the creation of object O1 (2A) at a first time and object O2 (6A) at a second time. In response to the handler being initiated and run on the UI thread, system 100 may store a relationship between the user action, the handler, and/or the UI thread in a storage device, such as database 140. For example, system 100 may store a relationship indicating that the handler was created in response to the user action, that the handler was created on the UI thread, and/or that the handler ran on the UI thread.

In response to object O1 being created on the UI thread, system 100 may store a relationship between the user action, any parent object, the object, and/or the creating thread (3A) in a storage device, such as database 140. For example, system 100 may store a relationship indicating that the first user action initiated the creation of the handler, that the handler initiated the creation of object O1, and that object O1 was created on the UI thread. Object O1 may then be run on a separate thread, such as thread T2 (4A). In response to object O1 being run, system 100 may create and/or store a mapping indicating the relationship between the user action, any parent object, the object, and/or the running thread (5A) in a storage device, such as database 140. For example, system 100 may store a relationship indicating that the first user action initiated the creation of the handler, that the handler initiated the creation of object O1, and that object O1 was created on the UI thread. Object O1 may then be run on a separate thread, such as thread T2 (4A). In response to object O1 being run, system 100 may store a relationship between the user action, any parent object, the object, and/or the running thread in a storage device, such as database 140. For example, system 100 may create and/or store a mapping indicating that the first user action initiated the creation of the handler, that the handler initiated the creation of object O1, and/or that object O1 ran on thread T2. The time associated with the start and/or end of the creation and/or run of object O1 may also be stored. After the run of object O1 is complete, object O1 may terminate without initiating the creation of any new objects.

As mentioned above, the handler may also initiate the creation of object O2 (6A). In response to object O2 being created on the UI thread, system 100 may store a relationship between the user action, any parent object, the object, and/or the creating thread (7A) in a storage device, such as database 140. For example, system 100 may create and store a mapping indicating that the first user action initiated the creation of the handler, that the handler initiated the creation of object O2, and/or that object O2 was created on the UI thread. Object O2 may then be run on a separate thread, such as thread T1 (8A). In response to object O2 being run on thread T, system 100 may store a relationship between the user action, any parent object, the object, and/or the running thread (9A) in a storage device, such as database 140. For example, system 100 may create and/or store a mapping indicating that the first user action initiated the creation of the handler, that the handler initiated the creation of object O2, and/or that object O2 ran on thread T1. The time associated with the start and/or end of the creation and/or run of object O2 may also be stored.

As shown in the example of FIG. 6, object O2 may also initiate the creation of another object, such as object O3 (10A) on thread T3. In response to object O3 being created on thread T3, system 100 may store a relationship between the user action, any parent object, the object, and/or the creating thread (11A) in a storage device, such as database 140. For example, system 100 may create and store a mapping indicating that object O3 was created in response to the first user action, that object O2 initiated the creation of object O3 and/or that object O3 was created on thread T1. Object O3 may then be run on thread T3 (12A). In response to object O3 being run on thread T3, system 100 may store a relationship between the user action, any parent object, the object, and/or the running thread (13A) in a storage device, such as database 140. For example, system 100 may create and/or store a mapping indicating that object O3 was created in response to the first user action, that object O2 initiated the creation of object O3, and/or that object O3 ran on thread T3. The time associated with the start and/or end of the creation and/or run of object O3 may also be stored.

Object O3 may also initiate the creation of another object, such as object O4 (14A) on thread T3. In response to object O4 being created on thread T3, system 100 may store a relationship between the user action, any parent object, the object, and/or the creating thread (15A) in a storage device, such as database 140. For example, system 100 may create and store a mapping indicating that object O4 was created in response to the first user action, that object O3 initiated the creation of object O4, and/or that object O4 was created on thread T3. Object O4 may then be run on a separate thread, such as the UI thread (16A). In response to object O4 being run on the UI thread, system 100 may store a relationship between the user action, any parent object, the object, and/or the running thread (17A) in a storage device, such as database 140. For example, system 100 may create and/or store a mapping indicating that object O4 was created in response to the first user action, that object O3 initiated the creation of object O4, and/or that object O4 ran on the UI thread. The time associated with the start and/or end of the creation and/or run of object O4 may also be stored. After the run of object O4 is complete, object O4 may terminate without initiating the creation of any new objects. In some implementations, object O4 may function to update the user interface.

During the run of object O3, a user may perform a second user action (1B). The detection of this second user action may in turn initiate a handler (e.g., an object) to perform various functions. In response to the handler being initiated and run on the UI thread, system 100 may store a relationship between the second user action, the handler, and/or the UI thread. Additionally, system 100 may also store a relationship between the first user action and the second user action. For example, system 100 may store a relationship indicating that the first user action was performed before the second user action, and that no user actions were performed between the first user action and the second user action.

In the example shown in FIG. 6, the handler may cause the creation of object O1B (2B) on the UI thread. In response to object O1B being created on the UI thread, system 100 may store a relationship between the user action, any parent object, the object, and/or the creating thread (3B) in a storage device, such as database 140. For example, system 100 may store a relationship indicating that the second user action initiated the creation of the handler, that the handler initiated the creation of object O1B, and that object O1B was created on the UI thread. Object O1B may then be run on a separate thread, such as thread T1 (48). In response to the object being run, system 100 may create and/or store a mapping indicating the relationship between the user action, any parent object, the object, and/or the running thread (5B). For example, system 100 may store a relationship indicating that the second user action initiated the creation of the handler, that the handler initiated the creation of object O1B, and that object O1B ran on thread T1. The time associated with the start and/or end of the creation and/or run of object O1B may also be stored. After the run of object O1B is complete, object O1B may terminate without initiating the creation of any new objects.

While the example of FIG. 6 shows various user actions, and the resultant concurrent processing of the user actions by separate threads executing on a device, such as client device 120 of system 100, examples of relating user action flows consistent with disclosed implementations may differ from the example shown in FIG. 6. For example, while FIG. 6 shows periods of time between processing objects on a particular thread, those periods of time are shown for convenience only, and system 100 may process objects at any time using any type of processing method (e.g., immediately starting the processing of an object as soon as the run of the previous object ends). As another example, while FIG. 6 shows four threads, any number of threads may be used by an application running on client device 120. As yet another example, while FIG. 6 shows a particular sequence of relating user action flows, the relation of user action flows can be performed in any sequence, and is not limited to the sequence shown in FIG. 6.

Figure 7:
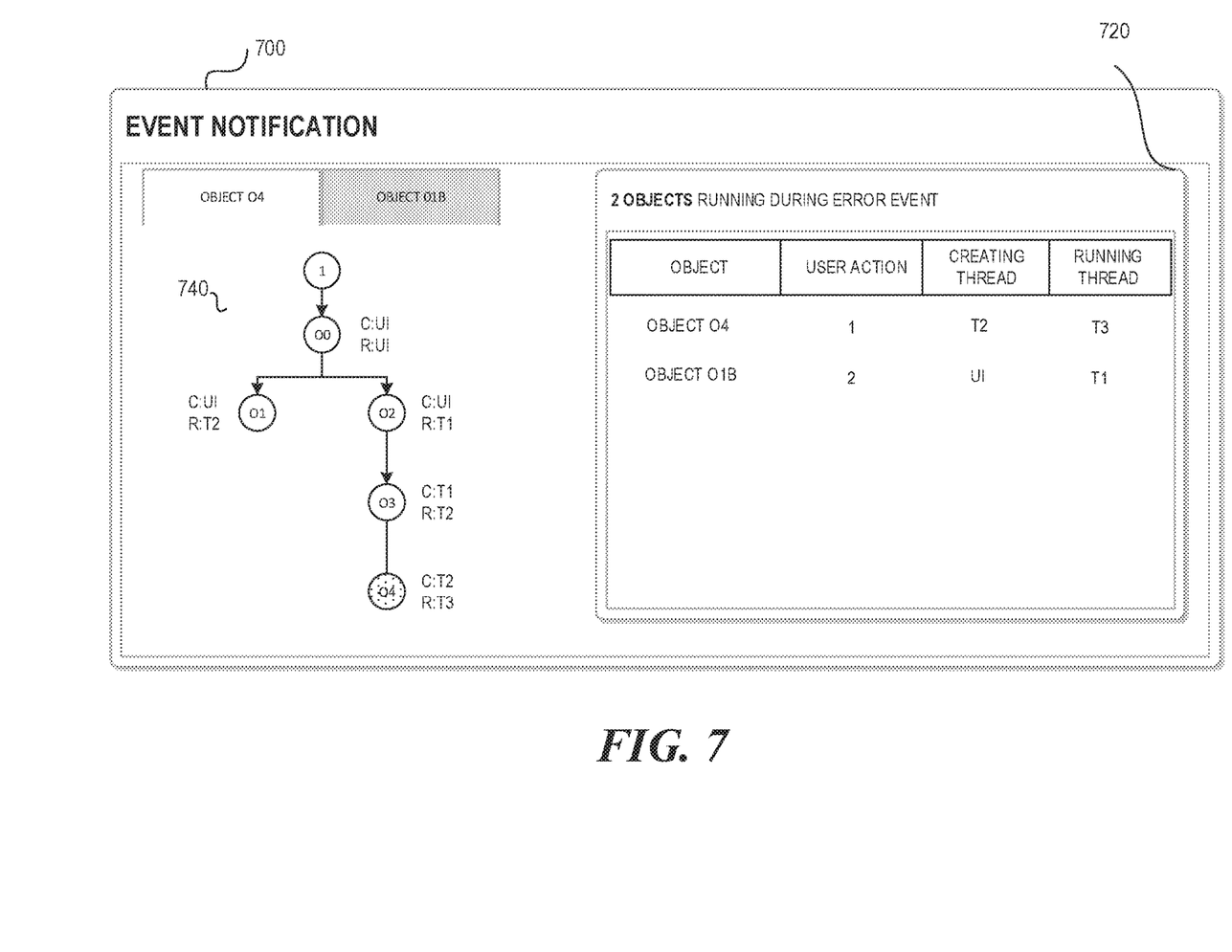
FIG. 7 is an example of a user interface for displaying user action flows consistent with disclosed implementations.

FIG. 7 is an example of a user interface 700 for displaying user action flows consistent with disclosed implementations. While interface 700 is described below with reference to system 100 of FIG. 1 and/or specific components of system 100, other suitable systems and/or devices for generating and/or otherwise interacting with interface 700 may be used. For example, processes described below as being performed by relation device 110 may be performed by client device 120, user action relation device 210, user action relation device 310, and/or any other suitable device. The processes described with respect to FIG. 7 may be implemented in the form of executable instructions stored on a machine-readable storage medium and/or in the form of electronic circuitry Interface 700 may be generated using a variety of methods. For example, interface 700 may be generated by device 110 based on flow data. For example, system 100 may access flow data from a machine-readable storage medium, database 140, and/or any other storage device to populate interface 700. Interface 700 may be displayed on a display device, such as a display device associated with application content provider device 130. For example, an application content provider may interact with interface 700 to determine an event associated with the application (e.g., a certain crash happening on a particular thread) and associate the event with a particular user action (e.g., a button tap). As another example, an application content provider may interact with interface 700 to determine the particular user action related to an event (e.g., an error) in real-time, without the need to review large amounts of data. As another example, an application content provider may interact with interface 700 to determine the most used flows in the application or the flows that use certain objects.

As shown in FIG. 7, interface 700 may display the flow data in a way that indicates the relationships between a user action, an object created in response to the user action, the creating thread, and/or the running thread. For example, interface 700 may include an area 720 for providing information about objects and/or threads that were running during a particular event (e.g., an error event) and area 740 for displaying user action flow related to the particular objects and/or threads. The information may be displayed as text, graphics, or a combination of text and graphics.

In the example shown in FIG. 7, area 720 may display a total number of objects that were running during an event. For example, system 100 may receive an event notification from a system resource (e.g. from client device 120), and display information related to the first event notification in area 720 of interface 700. In some implementations, the information may be used to perform root cause analysis related to the event notification. For example, in some implementations, relation device 110 may determine an object related to the event (and "event object"). System 100 may determine an event object in a variety of ways. For example, system 100 may determine an event object by performing a query based on the time of the event to identify objects and/or threads that were running during that time.

Relation device 110 may populate area 720 of interface 700 by determining a user action flow related to the event object based on flow data connected with the event object. In some implementations, the flow data may correspond to the flow data discussed above with respect to FIGS. 1-6, and may include a mapping between a user action, an object created in response to the user action, a creating thread for the object, and a running thread for the object. In some implementations, relation device 110 may access the flow data from a machine-readable storage medium, database 140, and/or any other storage device. For example, relation device 110 may perform a query to identify the user action related to the event object, the creating thread of the event object, and/or the running thread of the event object. Once the user action flow has been identified, the flow may be stored in a storage device, such as a machine-readable storage medium, database 140, and/or another storage device. In the example interface 700 shown in FIG. 7, area 720 of interface display 700 shows that objects O4 and O1B were running during the event, that objects O4 and O1B were created on thread T1 and the UI thread, respectively, and that objects O4 and O1B ran on threads T3 and T1, respectively.

Area 740 of interface 700 may be used to display a user action flow. In some implementations, area 740 may be used to display a user action flow related to an event object. For example, system 100 may determine a user action flow based on the flow data, and may display the flow data in area 740. In the example shown in FIG. 7, the user action flow data is displayed graphically. However, the flow data may be displayed using any type of method (e.g., in a table, etc.). The example of FIG. 7 illustrates that: object O0 was created and run on the UI thread in response to user action 1; that object O0 initiated the creation of objects O1 and O2 on the UI thread; that objects O1 and O2 were run on threads T2 and T1, respectively; that object O2 initiated the creation of object O3 on thread T1; that object O3 ran on thread T1; that object O3 initiated the creation of object O4 on thread T1; and that object O4 ran on thread T3.

Relation device 110 may limit the information displayed on interface 700 and/or may display flow data according to certain selection criteria. For example, a user may instruct measurement device 110 to limit the data displayed to information about a particular thread or a particular object. As another example, a user may instruct relation device 110 to limit the data displayed to data related to a particular user action, a particular type of device, a particular operating system, and/or a particular application.

The disclosed examples may include systems, devices, computer-readable storage media, and methods for relating user action flows. For purposes of explanation, certain examples are described with reference to the components illustrated in FIGS. 1-3. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Moreover, as used in the specification and the appended claims, the singular forms "a," "an," and "the" are intended to include the plural forms as well, unless the context indicates otherwise. Additionally, although the terms first, second, etc. may be used herein to describe various elements, these elements should not be limited by this terms. Instead, these terms are only used to distinguish one element from another.

Further, the sequence of operations described in connection with FIGS. 1-7 are examples and are not intended to be limiting. Additional or fewer operations or combinations of operations may be used or may vary without departing from the scope of the disclosed examples. For example, relation device 110 of system 100 may store a relationship between an object and a running thread before storing a relationship between the object and a creating thread. Furthermore, implementations consistent with the disclosed examples need not perform the sequence of operations in any particular order, including those in in FIGS. 4-7. Thus, the present disclosure merely sets forth possible examples of implementations, and many variations and modifications may be made to the described examples. All such modifications and variations are intended to be included within the scope of this disclosure and protected by the following claims.

We claim:

1. A system for relating user action flows comprising:
a processor; and
a memory storing instructions that when executed by the processor cause the processor to:
detect a first user action during an operation of an application;
create a first object on a first thread in response to the detection of the first user action;
detect that the first object is running on a second thread, the second thread being different from the first thread;
create, in a data structure, a first mapping between the first user action, the first object, the first thread on which the first object was created, and the second thread on which the first object was running;
update the data structure to include a second mapping in response to (1) a creation of a second object on the second thread during the run of the first object, and (2) a run of the second object on a third thread, wherein the second mapping is to map the second object to the first user action, the second thread, and the third thread; and
in response to an error event associated with the first object, display the first mapping including the first object, the first user action that caused the creation of the first object, the first thread on which the first object was created, and the second thread on which the first object was running.

2. The system of claim 1, wherein the instructions are to cause the processor to:
initiate the first thread in response to a launch of the application; and
create a third mapping between the launch of the application and the first thread.

3. The system of claim 1, wherein the instructions to cause the processor to create the first mapping include instructions to cause the processor to:
determine a first thread identifier of the first thread;
determine a first object identifier of the first object;
map the first object identifier to the first thread identifier;
determine a second thread identifier of the second thread; and
map the first object identifier to the second thread identifier.

4. The system of claim 3, wherein:
the instructions to cause the processor to map the first object identifier to the first thread identifier include instructions to cause the processor to update the data structure to map the first thread identifier to the first object identifier; and
the instructions to cause the processor to map the first object identifier to the second thread identifier include instructions to cause the processor to update the data structure to map the first object identifier to the second thread identifier.

5. The system of claim 1, wherein the instructions are to cause the processor to, prior to updating the data structure to include the second mapping:
monitor the second thread for creation of the second object;
detect that the second object is created on the second thread, the second object being created in response to the running of the first object;
create, in the data structure, the second mapping between the second object and the second thread on which the second object is created, the second mapping being stored external to the second object and the second thread;
run the second object on the third thread; and
update the second mapping in the data structure to include a mapping between the second object and the third thread on which the second object is running, the second mapping being stored external to the second object and the third thread.

6. The system of claim 5, wherein the instructions are to cause the processor to:
detect a second user action on the first thread;
create a third object on the first thread in response to the detection of the second user action;
create, in the data structure, a third mapping between the second user action and the third object;
run the third object on a fourth thread; and
update the third mapping in the data structure to include a mapping between the third object and the fourth thread on which the third object is running.

7. The system of claim 6, wherein the instructions are to cause the processor to:

receive a first event notification regarding a first event from a first system resource, the first event notification indicating an error related to an event object;

determine whether the event object is at least one of the first object, the second object, and the third object;

determine a flow related to the event object, the flow being based on:

the first mapping if the event object is the first object;

the second mapping if the event object is the second object; and the third mapping if the event object is the third object.

8. The system of claim 5, wherein:

the first thread is a user interface thread; and the third thread is the same thread as the second thread.

9. A computer-implemented method for relating user action flows comprising:

creating, by a processor, a first object on a first thread in response to a user action;

detecting, by the processor, the first object is running on a second thread;

creating, by the processor, in a data structure, a first mapping between the first object, the user action that cause the creation of the first object, the first thread on which the first object was created, and the second thread on which the first object was running;

updating, by the processor, the data structure to include a second mapping in response to (1) a creation of a second object on the second thread during the run of the first object, and (2) a run of the second object on a third thread, wherein the second mapping is to map the second object to the first user action, the second thread, and the third thread;

receiving, via the processor, a first event notification regarding a first event from a first system resource;

performing, via the processor, a root cause analysis on the first event notification, wherein performing the root cause analysis includes:

determining that an event object related to the first event is the first object; and determining flow data associated with the first object, the flow data including the first mapping between the user action, the first object created in response to the user action, the first thread on which the first object was created, and the second thread on which the first object was running; and displaying, in response to receipt of the first event notification, the first mapping between the user action, the first object, the first thread, and the second thread.

10. The computer-implemented method of claim 9, wherein determining the flow data includes providing, via the processor, information relating to the first thread that created the event object, the second thread that ran the event object, and the user action that initiated the creation of the event object.

11. The computer-implemented method of claim 9, wherein the first mapping comprises associating a user action identifier, an object identifier, a creating thread identifier, and a running thread identifier.

12. The computer implemented method of claim 9, wherein determining the event object includes:

determining, via the processor, a time of the first event; and determining, via the processor, for at least one user action in a database, whether the time corresponds to a time between the user action and an end of a run of a last object created in response to the user action.

13. The computer implemented method of claim 12, wherein determining the event object includes:

determining, via the processor, a device related to the first event; and determining, via the processor, for at least one user action in the database, whether the device corresponds to a device used to perform the user action.

14. The computer-implemented method of claim 9, further comprising:

creating the second object on the second thread during the running of the first object on the second thread;

creating a third mapping between the second object and the second thread on which the second object is created;

detecting that the second object is running on a third thread; and creating a fourth mapping between the second object and the third thread on which the second object is running.

15. The computer-implemented method of claim 14, further comprising:

receiving a notification indicating an error related to an event object;

determining whether the event object is one of the first object and the second object; and displaying a flow related to the event object, the flow being based on:

the first mapping and the second mapping if the event object is the first object; and the third mapping and the fourth mapping if the event object is the second object.

16. A non-transitory computer-readable storage medium including instructions which, when executed by a processor of a device for relating user action flows, cause the processor to:

create a first object on a first thread in response to a user action;

detect that the first object is running on a second thread;

create, in a data structure, a first mapping including a user action identifier associated with the user action, the first object that was created based on the user action, the first thread on which the first object was created; and a second thread on which the first object was running;

update the data structure to include a second mapping in response to: (1) a creation of a second object on the second thread during the run of the first object; and (2) a run of the second object on a third thread, the second mapping is to map the second object to the user action identifier, the second thread, and the third thread; and in response to an error event related to the first object, display the first mapping between the user action, the first object, the first thread on which the first object was created, and the second thread on which the first object was running.

17. The non-transitory computer-readable storage medium of claim 16, wherein, to create the first mapping in the data structure, the instructions are to cause the processor to populate the data structure with the user action identifier, the first object, the first thread, and the second thread.

18. The non-transitory computer-readable storage medium of claim 16, wherein, prior to updating the data structure to include the second mapping, the instructions are to cause the processor to:

create the second object on the second thread during the run of the first object; and detect that the second object is running on the third thread.

19. The non-transitory computer-readable storage medium of claim 16, wherein the instructions are to cause the processor to:
  receive a notification indicating an error related to an event object;
  determine whether the event object is one of the first object and the second object; and
  display a flow related to the event object, the flow being based on:
    the first mapping if the event object is the first object; and
    the second mapping if the event object is the second object.

* * * * *